(12) United States Patent
Schwab

(10) Patent No.: US 6,351,986 B1
(45) Date of Patent: Mar. 5, 2002

(54) METHOD FOR MEASURING WATER AND WASTEWATER PARAMETERS

(75) Inventor: Ulrich Schwab, Graefelfing (DE)

(73) Assignee: WTW Wissenschaftlich-technische Werkstaetten GmbH (DE)

( * ) Notice: Subject to any disclaimer, the term of this patent is extended or adjusted under 35 U.S.C. 154(b) by 0 days.

(21) Appl. No.: 09/458,211

(22) Filed: Dec. 9, 1999

(30) Foreign Application Priority Data

Dec. 9, 1998 (DE) .......................................... 198 57 014

(51) Int. Cl.$^7$ .............................. G01N 11/00; B03D 3/06
(52) U.S. Cl. ...................................... 73/53.01; 210/696
(58) Field of Search ........................ 73/53.01; 210/739, 210/96.1, 696; 137/3

(56) References Cited

U.S. PATENT DOCUMENTS

| | | | | |
|---|---|---|---|---|
| 4,435,291 A | * | 3/1984 | Matsko | ........................ 210/739 |
| 5,340,468 A | * | 8/1994 | Hawthorne et al. | ........ 210/96.1 |
| 5,360,549 A | * | 11/1994 | Mouche et al. | ............. 210/696 |
| 5,855,791 A | * | 1/1999 | Hays et al. | .................. 210/696 |
| 5,870,692 A | * | 2/1999 | Millo | ..................... 73/53.01 X |
| 6,068,012 A | * | 5/2000 | Beardwood et al. | ........... 137/3 |

FOREIGN PATENT DOCUMENTS

CA 2194831 * 7/1998 ............. G01N/1/10

* cited by examiner

Primary Examiner—Hezron Williams
Assistant Examiner—Jay L. Politzer
(74) Attorney, Agent, or Firm—Cantor Colburn LLP

(57) ABSTRACT

This invention concerns a method of measuring parameters of fresh and waste water, where the time change or the first derivative of the measured values is determined from the measured values of at least two successive measurements, considering the time interval between the measurements. The pause interval until the next measurement is then determined, depending on that value for the time change or first derivative.

4 Claims, 1 Drawing Sheet

METHOD FOR MEASURING WATER AND WASTEWATER PARAMETERS

This invention concerns a method of measuring the parameters of fresh water and waste water and an analysis device for measuring them.

Especially with automatic analysis devices, besides the constant availability of measurement, the consumption of chemicals is increasingly coming to the fore, which has a major influence on the cost of operating the device. The devices that work discontinuously that are on the market reduce the consumption of chemicals by increasing the measurement interval. But this drastically reduces the availability of the measured values. Thus, peaks or quick short-term fluctuations are lost by the measurement technology. Controlling a sewage-treatment plant after short-term fluctuations like cloudbursts, is therefore no longer possible.

The problem of this invention is to create a measurement method and an analysis device that minimize the consumption of reagents and chemicals, without losing information relevant for measurement technology.

The present invention provides a method of measuring parameters of fresh and waste water, comprising: determining a time change or first derivative of measured values from the measured values of at least two successive measurements, by dividing a difference between the successive measurements by a value corresponding to a time interval of the measurements; determining a pause interval until a next measurement, depending on a value of the time change or first derivative; comparing the value obtained for the time change in the measured value or first derivative with an allocation function, which allocates a correlating pause interval to the value; varying a length of a basic interval varies depending the value of the first derivative; and setting the basic interval manually or by program control according to the time of day or time progression within a period of time.

Also, the present invention provides an analysis device for parameters of fresh and waste water, with a control unit and at least one measurement arrangement for measuring a parameter of fresh or waste water, wherein the measurement is taken at time intervals, and the device comprises: a differential circuit for finding a differential value from a difference between successive measured values; a comparative circuit for comparing the differential value obtained with an allocation function filed in a reference-value storage unit and allocating an interval value obtained from the allocation function to a time-measurement component, whereby a measurement cycle can be initiated; and an interval changing circuit for changing the interval between measurements depending on the time, wherein the differential circuit divides the difference between successive measurements by a value corresponding to the time interval of the measurements and sends the differentiated value as the different value to the comparative circuit.

According to the invention, the difference between the values measured in two successive measurements is divided by a value corresponding to the time between the two measurements. This gives a first derivative of the measured value according to the time. If the value of this derivative is higher, this means that the measured values have changed a great deal compared to the last measurement. In this case, a shorter interval is used until the next measurement. If the value is lower than the first derivative, this means that the measured values have not changed very much, so the pause interval can be set to a higher value. This way, it is possible to adjust the measurement interval to the change in measured values. For example, if faster or shorter fluctuations occur, this results in a clear increase in the first derivative of the measured values, and then shorter measurement intervals can then automatically be set accordingly, until the short-term change is gone and the first derivative assumes smaller values again. If the changes in the measured values are only very slight, a very long pause interval can be set.

Thus it is possible to minimize the consumption of power and chemicals for measurement, without losing information relevant for measurement technology.

Preferably, an allocation function, for example in the form of a table or a mathematical function, is stored in the measurement device, and a certain value of a derivative can be assigned right away to a certain pause interval. This method of control is very simple to use with no big hardware or software expense.

A device for analyzing the method requires a differential circuit that finds the difference between successive measurements and divides that difference by a value that corresponds to the time interval between the measurements. A comparative circuit must also be provided in order to compare the value obtained in the first derivative with corresponding values of an allocation function and from that function to obtain a pause interval to set the time for the next measurement.

Of course, manual adjustment can be provided in order to influence the measurement intervals set automatically in the way described above, for example to reduce or increase them.

The first derivative of the measured value is expressed as $dC/dT$, where C is the concentration measured for one parameter of fresh or waste water and T is the time between the two measurements. Of course, the last two measurements need not be used to calculate the first derivative. The derivative can also be calculated from several measuring points or it is also possible not to use the last two measurements to get the first derivative. This can vary depending on the individual requirements. The measurement method can especially be used for a phosphate assay in an activator basin.

Of course, the method can be lengthened or shortened by a basic interval depending on the value of the first derivative. It is now possible to input the basic interval variably, for example for different days or times of the day, in order to influence the measurement process thereby as well. This change in the basic interval can also be program-controlled, i.e., can be made automatically. The basic interval is then generally set shorter in times when greater fluctuations occur in the waste water or can be expected in the type of waste-water occurrence.

The invention will be described below by example using one preferred example of embodiment associated with the enclosed drawings. This embodiment should not be understood as a limitation of the invention.

Figure 1:
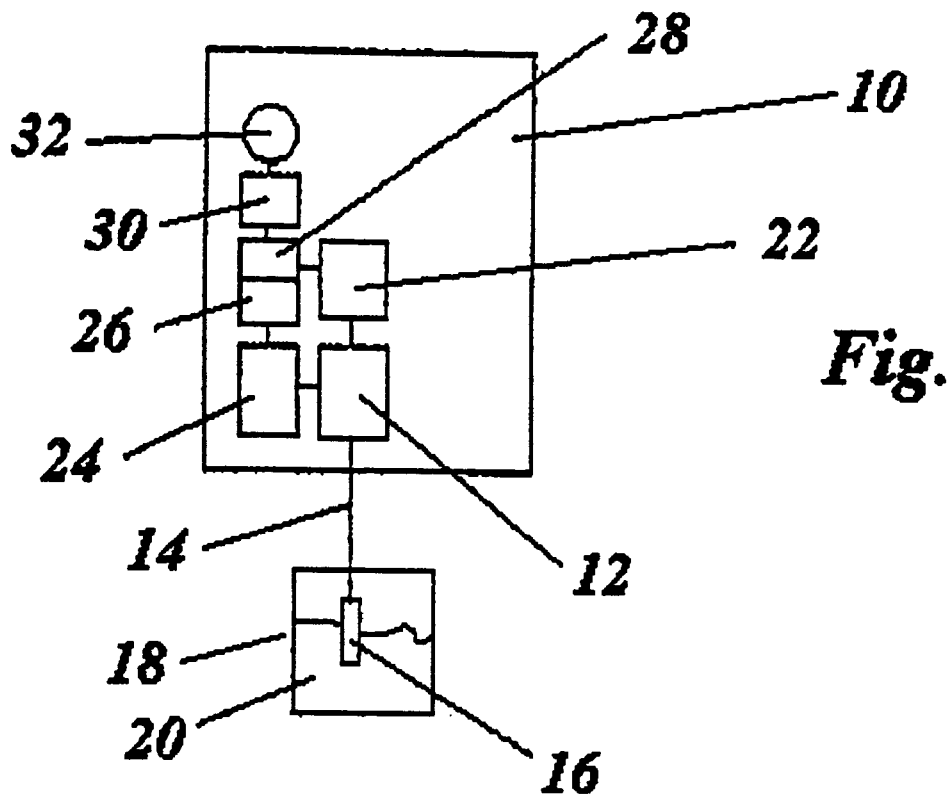
FIG. 1 shows a schematic drawing of a device for measuring parameters of fresh water and waste water.

FIG. 1 shows an analysis device 10 for measuring a waste-water parameter, for example the BOD value (Biological Oxygen Demand). The device 10 includes a control unit 12, which is connected to a measurement probe 16 via a signal line 14; the probe is immersed in a waste-water sample 20 in a sample vessel 18. The control unit 12 also contains a time-measurement component 22, which controls the measurement periods, i.e., the time intervals in which measurements are taken.

Figure 2:
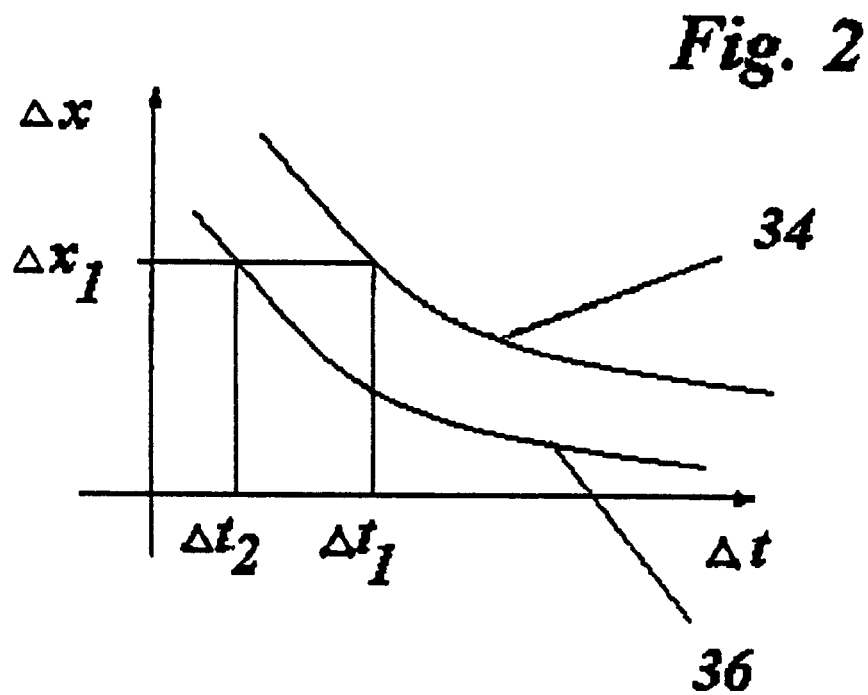
FIG. 2 shows curves that describe the relation between the size of the change in successive measurements in relation to the measurement interval.

The measured values obtained by the measurement probe 16 go through the signal line 14 of the control unit 12 and then to a storage and/or processing unit 24, where the measured values are either stored or evaluated. The measured values are also fed to a differential circuit 26, which finds x measured-value differences Δx from successive measured values. These measured value differences then go to a comparative unit 28, which is connected to a reference value storage unit 30. The reference-value storage unit 30 stores allocation tables, as shown in FIG. 2 for example. The allocation functions or tables allocate an allocated measurement interval Δt to a certain measured-value difference Δx. In the comparative circuit, the difference in value determined in the differential circuit Δx is compared with the curve or function in the reference-value storage unit 30 and the allocated measurement interval is determined from it. This value goes to a time-measurement component 22, which in turn sets the measurement interval, i.e., the time interval between measurements.

The reference-value storage unit 30 is also connected to a clock 32, which acts so that difference stored curves are used in the reference-value storage unit, depending on the time of year, weekday or time of day.

For example, FIG. 2 shows a curve 34 for a holiday, in which, as expected, smaller fluctuations in waste-water occur than on weekdays. Therefore a certain difference in the measured value Δt1 results in a fairly long measurement interval. On workdays, another curve 36 is automatically loaded in the reference-value storage unit 30, controlled by the clock 32, which results in a much shorter measurement interval Δt2 for the same difference in the measured value. Different curves can also be stored and controlled for times of the year or day.

Instead of simple differences in measured values, in which the last measured value is deducted from the next-to-last measured value, initial derivatives of the measured values by time can also be used considering the measurement intervals.

What is claimed is:

1. A method of measuring parameters of fresh and waste water, comprising:

determining a time change or first derivative of a course of the measured values from the measured values of at least two successive measurements, by dividing a difference between the successive measurements by a value corresponding to a time interval of the measurements;

determining a pause interval until a next measurement, depending on a value of the time change or first derivative;

comparing the value obtained for the time change in the measured value or first derivative with an allocation function, which allocates a correlating pause interval to the value;

varying a length of a basic interval with the value of the first derivative; and setting the basic interval manually or by program control according to a time of day or time progression within a period of time.

2. An analysis device for parameters of fresh and waste water, with a control unit and at least one measurement arrangement for measuring a parameter of fresh or waste water, wherein the measurement is taken at time intervals, the device comprising:

a differential circuit for finding a differential value from a difference between successive measured values;

a comparative circuit for comparing the differential value obtained with an allocation function filed in a reference-value storage unit and for allocating an interval value obtained from the allocation function to a time-measurement component, whereby a measurement cycle can be initiated; and an interval changing circuit for changing the interval between measurements depending on the time, wherein the differential circuit divides the difference between successive measurements by a value corresponding to the time interval of the measurements and sends the differentiated value as the different value to the comparative circuit.

3. The analysis device in claim 2, wherein the device is employed for phosphate assay in an activator basin.

4. The analysis device in claim 2, wherein the device is employed for measuring a biological oxygen demand (BOD) value of waste water.

* * * * *